(12) United States Patent
Kuntze-Fechner

(10) Patent No.: US 8,926,280 B2
(45) Date of Patent: Jan. 6, 2015

(54) ROTOR BLADE MADE OF A FIBRE-REINFORCED COMPOSITE MATERIAL AND PRODUCTION METHOD FOR IT

(75) Inventor: Gerald Kuntze-Fechner, Waakirchen (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 1043 days.

(21) Appl. No.: 12/753,927

(22) Filed: Apr. 5, 2010

(65) Prior Publication Data

US 2010/0278655 A1 Nov. 4, 2010

(30) Foreign Application Priority Data

Apr. 29, 2009 (EP) ..................... 09400020

(51) Int. Cl.
*B64C 27/473* (2006.01)
*B64C 27/48* (2006.01)
(52) U.S. Cl.
CPC ............... *B64C 27/473* (2013.01); *B64C 27/48* (2013.01); *B64C 2027/4736* (2013.01)
USPC ..................... 416/134 A; 416/230; 416/241 A
(58) Field of Classification Search
USPC .......... 416/230, 241 A, 134 A, 138, 140, 141
See application file for complete search history.

(56) References Cited

U.S. PATENT DOCUMENTS

| 4,299,538 | A | | 11/1981 | Ferris | |
|---|---|---|---|---|---|
| 4,990,205 | A | * | 2/1991 | Barbier et al. | 156/242 |
| 5,286,167 | A | * | 2/1994 | Byrnes et al. | 416/134 A |
| 5,738,494 | A | * | 4/1998 | Schmaling | 416/134 A |
| 5,755,558 | A | * | 5/1998 | Reinfelder et al. | 416/230 |
| 5,810,285 | A | * | 9/1998 | LeMasurier | 244/17.19 |
| 6,056,838 | A | * | 5/2000 | Besse et al. | 156/75 |
| 2008/0101934 | A1 | * | 5/2008 | Stamps et al. | 416/134 A |

FOREIGN PATENT DOCUMENTS

| FR | 2 740 379 | | 4/1997 |
|---|---|---|---|
| GB | 2036677 | A1 | 7/1980 |
| GB | 2131373 | A | 6/1984 |
| WO | 93/04917 | | 3/1993 |

OTHER PUBLICATIONS

European Search Report dated Nov. 25, 2009, from corresponding application European application.

* cited by examiner

*Primary Examiner* — Dwayne J White
*Assistant Examiner* — Justin Seabe
(74) *Attorney, Agent, or Firm* — Brooks Kushman P.C.

(57) ABSTRACT

A rotor blade in a fiber-reinforced composite design for a tail rotor of a rotary wing aircraft (helicopter), with a blade section (5; 5') having a blade skin (a, r) and a blade body (b ... g, s, t), which blade section (5; 5') forms an aerodynamically effective profile, with a blade tip (6) that faces away from the hub of a drive device of the rotor; and with a coupling section (9, 11; 9', 11') which faces towards the hub, with an attachment device (2) for a tension-torque-transmission element (3) and for a control tube (4) is improved in that the blade section (5; 5') and the coupling section (9, 11; 9', 11') include spar tapes (a ... g) that go all the way through and that are made of unidirectional fiber material.

17 Claims, 2 Drawing Sheets

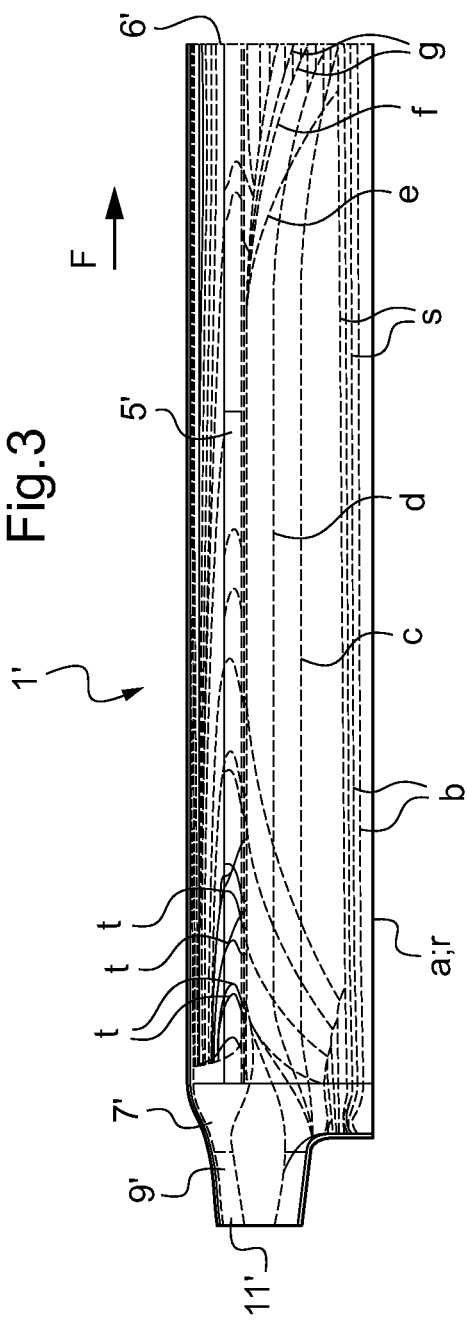
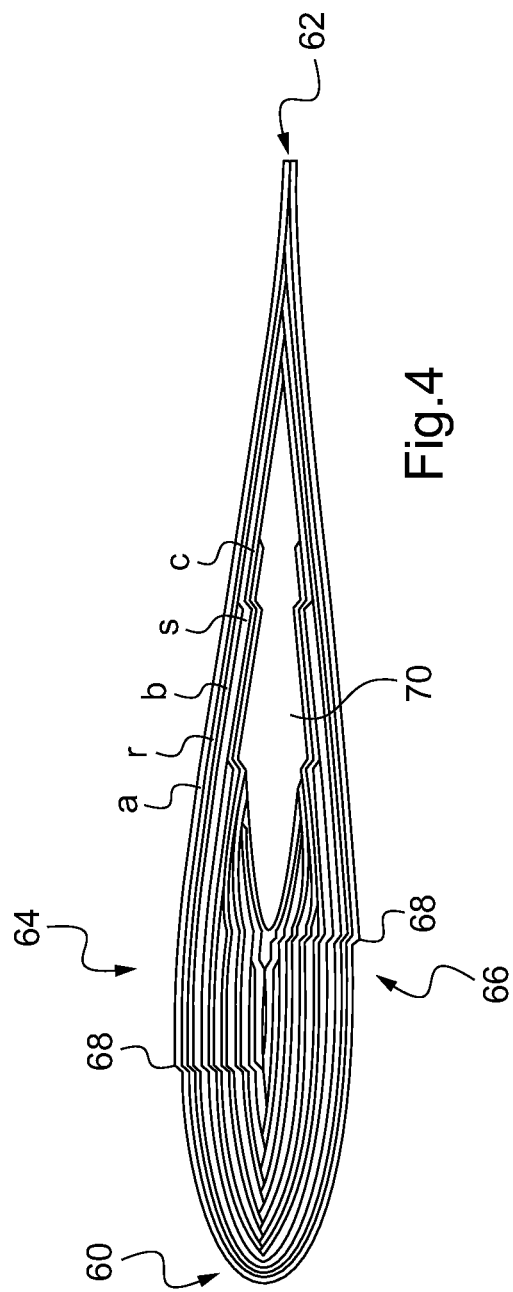

ROTOR BLADE MADE OF A FIBRE-REINFORCED COMPOSITE MATERIAL AND PRODUCTION METHOD FOR IT

FIELD OF THE INVENTION

The invention relates to a rotor blade in a fibre-reinforced composite design for a tail rotor of a rotary wing aircraft or helicopter, in particular for a shrouded tail rotor, a so-called fenestron. The rotor blade comprises a blade section having a blade skin and a blade body, wherein the blade section forms an aerodynamically effective profile. The rotor blade comprises a blade tip that faces away from the hub of a drive device of the motor, and comprises a coupling section that is opposite it and that faces the hub. The coupling section comprises an attachment device for a tension-torque-transmission element and for a control tube. The tension-torque-transmission element is used to connect the rotor blade to the hub and essentially transmits the centrifugal forces that in operation act on the rotor blade. By way of the control tube or the control sleeve, on the one hand control forces in the form of moments are exerted on the longitudinal axis of the rotor blade in order to twist the rotor blade, while on the other hand it introduces bending moments, for example resulting from flapping of the rotor blade, into the bearing of the rotor blade, for example into a fenestron pot.

BACKGROUND OF THE INVENTION

Rotor blades in fibre-reinforced composite design, in particular also fenestron blades, have already been used for about 30 years. In the helicopter "Dauphin N4" made by the applicant, a fenestron blade in RTM construction was used in which a separate tension-torque-transmission element made of metal was connected in a control tube by means of a bolt attachment. The control tube was tied in a single piece to the rotor blade and was also constructed in a fibre-reinforced composite design. However, due to the necessity of applying many individual fibre layers, production of this fenestron blade was involved and very cost-intensive. Added to this cost disadvantage was a comparatively short service life.

OBJECT AND SUMMARY OF THE INVENTION

It is an object of the invention to avoid these disadvantages in a fenestron blade in a fibre-reinforced composite design.

In the rotor blade mentioned in the introduction this object is met in that the rotor blade and the control tube are designed so as to be separate from each other. To this effect, the blade section of the rotor blade and its coupling section comprise spar tapes that go all the way through and that are made of unidirectional fibre material. The invention thus moves away from a combination of a blade section of a rotor blade with a control tube and/or with a tension-torque-transmission element in a single component. Instead, the invention pursues the principle of constructing the rotor blade as a separate component in order to match its design exclusively to the forces experienced in the rotor blade, and in this way to simplify said design.

According to the invention, the rotor blade comprises spar tapes made of a fibre material whose fibres practically extend exclusively in a single direction, in other words unidirectionally. They extend without interruption and without disturbance from the blade tip over the entire blade section right to the coupling region of the rotor blade. Since the direction of the flow of the fibres also corresponds to the direction of the centrifugal force that during operation acts on the rotor blade, the spar tapes can optimally absorb the loads experienced. The design of the rotor blade from unidirectional fibre material that is oriented in the direction of loading results in optimal and economical utilisation of materials. It results in minimal tension in the component, and consequently the rotor blade has a long service life. The simple structure involves a reduced risk of manufacturing errors and ensures good reproducibility of the rotor blade at the same high quality. When compared to a design of the rotor blade involving metal, a fibre-reinforced composite design provides the decisive advantage of significantly reduced weight. Furthermore, the rotor blades in a fibre-reinforced composite design can be dimensioned so as to be longer and to comprise greater profile depth than would be possible in the case of a metal construction.

According to an advantageous embodiment of the invention, the spar tapes comprise a rectangular cross section. The simple rectangular cross section for almost all the spar tapes or fibre layers simplifies the preparation of ready-made items, because the future position of the fibre layer in the rotor blade is largely independent of its cross section. This results in a simple and economical design that results in a reduced risk of errors and thus ensures higher quality.

For the purpose of creating the aerodynamically effective profile of the blade body, according to a further advantageous embodiment of the invention, the spar tapes are arranged so as to be layered, and if need be staggered. Despite an identical cross section, in this way, by means of the spar tapes that extend right through, the very different cross-sectional profiles of the rotor blade on the one hand, and of the coupling section on the other hand, can be produced without substantial cutting waste. Thus the production costs of the rotor wing are reduced.

The coupling section of the rotor blade represents the interface with the tension-torque-transmission element, at which interface predominantly centrifugal forces are transmitted. According to a further advantageous embodiment of the invention, the coupling section comprises a connecting eye by means of which the rotor blade can be attached to the drive device by way of a bolt that essentially extends perpendicularly to its plane of extension. In the simplest case the connecting eye can be designed as a cylindrical opening in the coupling section. It breaks through the individual flat fibre layers perpendicularly to their plane of extension. The centrifugal forces and the holding forces opposing them are transmitted as compressive forces, by way of the generated surfaces of the bolt, onto the hole-face of the cylindrical opening and vice-versa. The hole-face is formed by the intersecting planes of the spar tapes that are layered perpendicularly to the axis of the opening. In operation, the connecting eye forms a hole-face connection which loads the fibre layers of the coupling section and thus also those of the tension-torque-transmission element practically exclusively in their plane of extension, with the load thus being optimal in accordance with the fibres.

During the introduction of forces by way of a bolt, no force deflection in the fibre layers occurs as a result of the hole-face connection, which force deflection could result in delamination in the region of the coupling section. Instead, the loaded fibre layers extend essentially without rotation and without twisting between the connecting eye and the rotor blade. This is beneficial in the context of economical and simple low-fault production that results in a long service life and light weight of the rotor wing. The coupling section with the connecting eye for force introduction by means of the hole-face thus provides a component that is not disturbed by fibre ends, fibre butt joints or deflected fibre layers. The component introduces the force of the bolt optimally into the rotor wing. As a completely undisturbed component it has been shown to have a particularly good load-bearing capacity and can be manufactured with few errors.

Moreover, the design is associated with an advantage in that it requires only a low design height while providing adequate load resistance. For example, the coupling section can comprise an axially extending receiving pocket for the tension-torque-transmission element, into which pocket it can be slid and in which it can be attached. Said pocket can enclose the tension-torque-transmission element in a fork-like manner and can attach it by means of a bolt that extends perpendicularly. The small dimensions of this design reduce the overall costs because the rotor blade is more compact, and thus the rotor can be designed to be smaller while offering the same aerodynamic performance.

According to a further advantageous embodiment of the invention, the connecting eye is formed only in the cured state of the tension-torque-transmission element. It can, for example, be milled or drilled, in any case it can be produced later. This results in a very even and homogeneous margin design of the cylindrical hole-face of the connecting eye, from which its later production can be detected without any doubt. As a result of the production at a later stage, the fibre layers are completely compact and tightly packed without any interfering trapped air or fanned-open areas, thus forming a continuous closed hole-face. As a result of the undisturbed construction of the margin, the coupling section can be fully exposed to loads right up to the margin of the connecting eye, which results in optimum cross-sectional utilisation and thus in minimal dimensions of the coupling section. Since its dimensions also have ramifications for the control tube that is connected to said coupling section, which control tube in turn is held in the fenestron pot, the smaller dimensions of the coupling section can also favourably influence dimensioning and thus overall costs of the fenestron.

The coupling section can thus in addition also represent the connection between the rotor blade and the control tube. In this case, in the coupling section, bending moments are also transmitted to the control tube. The control tube can be made from any material, for example from metal, or it can be produced in a fibre-reinforced composite design and can be attached to the rotor blade by way of a connecting means. According to a further advantageous embodiment of the invention, the connecting means is designed in such a way that it can attach to the rotor blade both the tension-torque-transmission element and the control tube. With the functional combination of the connecting means as an attachment both of the tension-torque-transmission element and of the control tube, a component for attaching the control tube and its installation can be done without. For example, the bolt that attaches the tension-torque-transmission element in a non-positive manner to the rotor blade can also penetrate the control tube and can connect it also to the rotor blade by way of a hole-face connection. This combination only becomes possible as a result of the hole-face connection, because its space requirements are so small that it can be accommodated within the control tube, in a very confined space, together with the connection of the tension-torque-transmission element.

The control tube transfers to the rotor blade essentially moments on its longitudinal axis. As a rule, these moments are smaller than those forces that are transferred to the rotor blade by the tension-torque-transmission element. The connecting means can therefore absorb the additional forces from the control tube without any great change in its dimensions.

According to a further advantageous embodiment of the invention, the coupling section comprises a cross-sectional shape that makes it possible to interconnect the rotor blade and the control tube in a manner having positive fit. For force transmission of control forces between the rotor blade and the control tube, said coupling section comprises a cross section that in particular differs from a circular cross section. The invention thus moves away from a circular cross-sectional contour at the contact locations of a separate rotor blade and of the associated control tube. Instead, the invention pursues the principle of making possible the force transmission of the control forces for the rotor blade by means of a positive-locking fit between the rotor blade and the control tube. In other words, the cross-sectional shape of the coupling section of the rotor blade and of the corresponding tie section of the control tube, which interact during force transmission, is thus designed to make it possible to reliably transmit moments on the longitudinal axis of the rotor blade between the two sections.

The cross-sectional shapes of the interacting sections can essentially correspond or they can cooperate, having positive fit, on an adequate number of contact surfaces. Thus, a tie section of the control tube can have a square cross-sectional shape, the four corners of which can be engaged by a four-beam cross-shaped or star-shaped cross-sectional shape of the coupling section of the rotor blade so as to transmit a moment on the centre of the square cross section. In other words, positive-locking force transmission does not require complete or linear contact of the control tube within the coupling section of the rotor blade. Point-like contact at an adequate number of contact points can be sufficient.

The connection having positive fit can relieve an additional other connection, for example a bolt connection, to the extent it is still required. Said connection having positive fit can even be the only connection between the coupling section and the tie section, because it is sufficiently capable. It then contributes to savings in weight and installation effort, which in turn reduce the costs of the system. As a result of physically separating the rotor blade from the control tube, both components can be produced more simply, economically and with less scope for error, which is also beneficial in the context of the service life of both components. In this way for each component an optimal design and the most favourable material can be selected depending on the loads to be encountered.

As a separate component the rotor blade furthermore provides greater freedom of design. The rotor blade can provide increased stability and can be simpler to produce because during its production in a fibre-reinforced composite design all the fibres of the blade can extend, optimally flat and without any great deflection, into the coupling section of the rotor blade. As a result of not having any deflection, for example by fanning or splitting the fibre layers open in order to form an integrated control sleeve, transverse tensile strain in the fibre layers can be excluded. Said strain could result in delamination and could thus have a negative effect on the stability and the service life of the rotor blade. Furthermore, the production process of the rotor blade is simplified, and consequently not only is the risk of production errors occurring reduced, but the reproducibility of the production process is also enhanced. For this reason the rotor blade can be produced at high quality even in series production in a fibre-reinforced composite design.

Depending on the concrete geometry of its profile region, in operation the rotor blade is given a so-called angle of incidence relative to its rotation plane. The angle of incidence is predetermined for aerodynamic reasons; it can be up to 20°. In contrast to this, as a rule, the tension-torque-transmission element extends in the rotation plane. It generally connects to the rotor blade in a fork-shaped attachment, which for a bolt connection comprises an opening perpendicular to the plane of extension of the tension-torque-transmission element. Thus, in the rotor blade, angular adjustment must take place outside the blade section. To this effect the axial fork-shaped attachment and the opening for the bolt connection can be arranged in a non-tilted cross section of the coupling section relative to the rotor blade, so as to be tilted by the angle of incidence. The opening then penetrates the fibre layers in the coupling section at an angle that differs from 90°. Since the fork-shaped attachment is not aligned parallel to the fibre layers of the coupling section, they are cut obliquely. In this way the contours of the fibre layers differ from each other depending on the concrete position of said fibre layers in the rotor blade.

As an alternative, the torsional movement can be arranged between the coupling section and the blade transition section. The coupling section together with the fork-shaped attachment is then tilted by the angle of incidence relative to the rotor blade. This requires a separate torque-transmission section in which the fibre layers from the blade section are twisted by an amount equal to the angle of incidence, and lead to the fork-shaped attachment in the region of the coupling section.

According to a further advantageous embodiment of the invention, the torque-transmission section is arranged in the coupling section of the rotor blade. If the torsional movement is integrated in the coupling section, the rotor blade can be designed so as to be shorter, which results in savings in cost and weight. With its position in the coupling section and thus within the control tube the torque-transmission section is, furthermore, moved from the region of the rotor blade, which region is subjected to airflow, to a region that is not subjected to airflow and is thus aerodynamically not effective. This is advantageous because the cross section of the torque-transmission section is larger towards the main direction of extension of the rotor blade, which larger cross section would create aerodynamic drag. It can thus be eliminated.

Further embodiment options of the coupling section, in particular relating to its cross-sectional shape, are described in the European patent application EP 09 400 019.7, filed before the German Patent Office with the same filing date as the present patent application, in the name of Eurocopter Deutschland GmbH (inventor: Gerald Kuntze-Fechner) and which concerns a "Rotor blade with control tube", whose content is herewith expressly also incorporated to form the subject of the present application.

The tension-torque-transmission element essentially transmits the centrifugal forces of the rotor blade to the hub of the drive device. At the same time it needs to be torsionally flexible within certain limits so as to avoid acting against the control moments that the control tube transmits to the rotor blade. Torsionally flexible tension-torque-transmission elements are known that comprise several metal lamellae or that comprise thin metal wires that are wound around two connecting bushes ("yarn reels"). They can be combined with the connecting means of the rotor blade according to the invention. According to a further advantageous embodiment of the invention, the tension-torque-transmission element, too, is made in a fibre-reinforced composite design. It essentially comprises fibre layers that are arranged in stacked layers parallel, one on top of the other, in a way that is comparable to that of the metal lamellae. However, with the same load-bearing capacity, installation and handling as a tension-torque-transmission element made of metal, the tension-torque-transmission element made in a fibre-reinforced composite design is significantly lighter in weight.

According to an advantageous embodiment of the invention, the fibre layers comprise spar tapes made of unidirectional fibre material. The spar tapes form individual flat layers whose flow of the fibres extends in the direction of force flux, in other words in the direction of centrifugal force, thus having an excellent load-bearing capacity in this direction. This design comprising unidirectional fibre material that is oriented in the direction of load results in optimal and economical utilisation of materials. The simple structure involves a reduced risk of manufacturing faults and ensures good reproducibility of the tension-torque-transmission element at the same high quality.

A design of the tension-torque-transmission element comprising several layered spar tapes that essentially extend in the direction of extension of the rotor wing and that are separate from each other has been shown to be particularly advantageous both as far as torsional rigidity and, in particular, as far as its production are concerned. Several layered spar tapes that are interconnected, together form a lamella, with several lamellae forming the tension-torque-transmission element. Adjacent lamellae can be separated by separation layers so that with suitable dimensions of the cross section the tension-torque-transmission element obtains the desired torsional rigidity. The separation layers between adjacent lamellae decouple the lamellae from each other so that, in the case of twisting, transmission of shearing strain between the lamellae is at least reduced. This nonetheless results in a very compact design of the tension-torque-transmission element.

According to a further advantageous embodiment of the invention, slots can be formed between the lamellae, which slots provide an air gap as a separation layer. Thus in this region the facing lateral surfaces of the lamellae no longer contact each other directly; instead they incorporate an air gap between each other. In this way any transmission of shearing strain between individual lamellae is excluded. Moreover, the absence of separate separation film provides an advantage in that production of the tension-torque-transmission element becomes simpler and more economical. It should be kept in mind that the separation layers can be subject to ageing, to becoming brittle and to swelling due to the influence of temperature and humidity. Furthermore, they can wear as a result of fibre layers chafing against each other due to bending loads and torsional loads. Furthermore, the spaced-apart lamellae can individually be inspected for any damage.

Further embodiment options of the separate tension-torque-transmission element are provided in the European patent application EP 09 400 017.1, filed before the German Patent Office with the same filing date as the present patent application, in the name of Eurocopter Deutschland GmbH (inventors: Gerald Kuntze-Fechner, Martin Schulz) and which concerns a "Tension-torque-transmission element for a fenestron blade and method for producing it", whose content is expressly incorporated to form the subject of the present application too.

BRIEF DESCRIPTION OF THE DRAWINGS

The principle of the invention is explained in more detail below in an exemplary manner with reference to the drawing. The following are shown in the drawing:

FIG. 3 a top view of a rotor blade;

FIG. 4 a section view of a rotor blade.

MORE DETAILED DESCRIPTION

Figure 1:
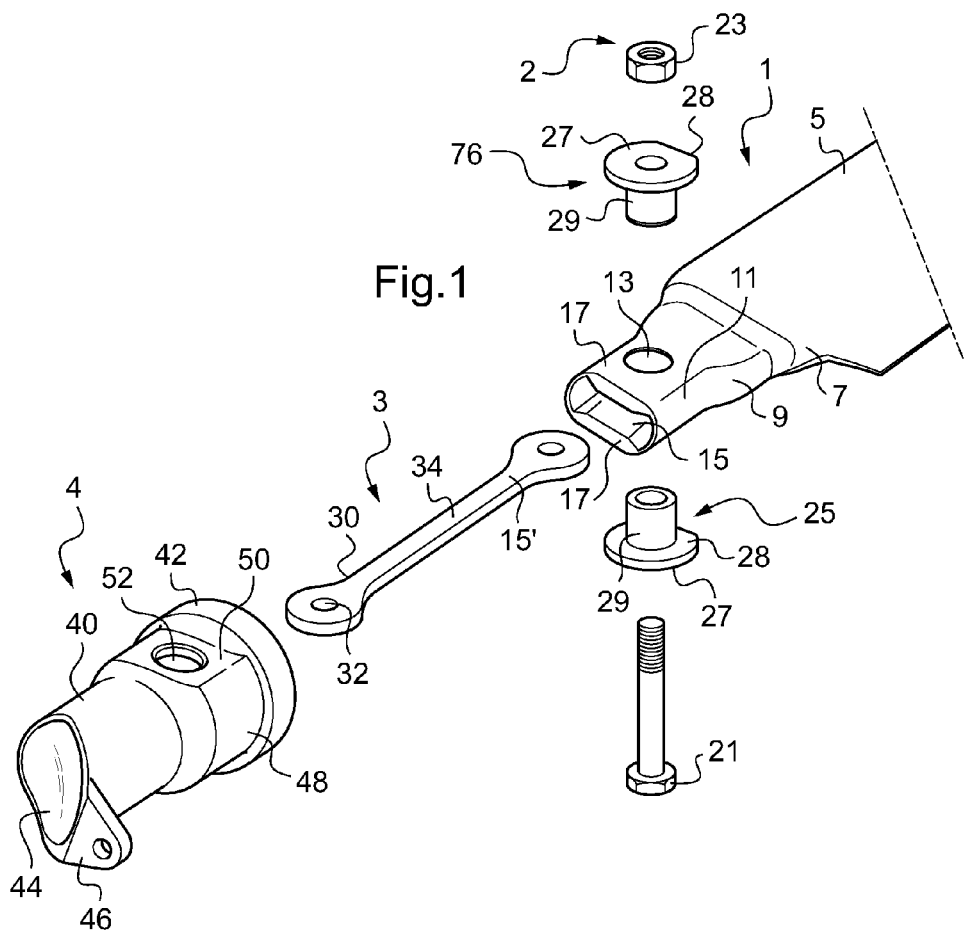
FIG. 1 a rotor blade with a separate tension-torque-transmission element and a control tube in a disaggregated component view.

FIG. 1 shows a rotor blade 1 with a separate tension-torque-transmission element 3 and a control tube 4 in a disaggregated component view. The rotor blade 1 comprises a blade section 5 that comprises an aerodynamic profile according to FIG. 4. This is followed by a blade transition section 7 that has a strong change in cross section from the cross section of the blade section 5 to the compact cross section of the following coupling section. The coupling section comprises a torque-transmission section 9 and a connecting section 11. The torque-transmission section 9 compensates for an angle of incidence of the rotor blade 1 of approximately 16° relative to its rotation plane. The connecting section 11 that connects to said torque-transmission section 9 also extends essentially in the rotation plane of the rotor blade 1. The connecting section 11 is used to attach a separate tension-torque-transmission element 3 and a control tube 4. To this effect the connecting section 11 comprises a cylindrical through-hole 13 for attachment, in a direction perpendicular to the rotation plane of the rotor blade 1. Furthermore, the connecting section 11 comprises a fork-shaped receiving pocket 15 that in the direction of a longitudinal axis of a rotor blade 1 extends axially into the connecting section 11, and its almost flat lateral walls 17 are penetrated by the attachment hole 13.

A bolt 21 and a counter nut 23 that interacts with it represent the essential common attachment means 2 both for the tension-torque-transmission element 3 and for the control tube 4 on the rotor blade 1. The bolt 21 also penetrates the control tube 4 in a direction perpendicular to the rotation plane of said bolt. The bolt 21 is inserted in two sleeves 25, each being inserted from one of the two walls 17 from the outside into the attachment hole. Each sleeve 25 comprises a collar 27 with a flat part 28 and a shaft 29.

The separate tension-torque-transmission element 3 is designed symmetrically on its longitudinal axis and its transverse axis, with the design being quasi bone-shaped. At its ends said tension-torque-transmission element 3 comprises a tie section 30 with a connecting eye 32. A torque-transmission element 34 forms the middle region of the tension-torque-transmission element 3.

The control tube 4 comprises an essentially tubular base body 40 on which on the blade side a bearing arrangement section 42 of a larger diameter, and on the hub side a bearing arrangement section 44 of smaller diameter are arranged. On its end on the hub side, at which end it is cut obliquely relative to its rotation axis, a control lever 46 is arranged so as to be radially distant. Between the bearing arrangement section 42 on the blade side, and the bearing arrangement section 44 on the hub side an attachment section 48 extends, whose generated surface that is cylindrical in the plane of projection comprises two flat parts 50 that are opposite each other and are thus arranged so as to be parallel to each other. In said flat parts 50 a radially aligned attachment hole 52 is arranged, whose internal diameter corresponds to the external diameter of the sleeves 25 in the region of their shaft 29.

Only a single connecting means 2, namely the bolt 21, connects the rotor blade 1 to the tension-torque-transmission element 3 and to the control tube 4. To this effect the control tube 4 is slid onto the connecting section 11 of the rotor blade 1 until its attachment hole 42 is flush with the attachment hole 13 of the rotor blade 1. By inserting the sleeves 25 into the attachment hole 52 the control tube 4 is preliminarily fixed to the rotor blade 1 because the shaft 29 of the sleeve 25 engages the attachment hole 13 of the rotor blade 1. Now the tension-torque-transmission element 3, with one of its tie sections foremost, can be inserted through the base body 40 of the control tube 4 into the receiving pocket 15 in the rotor blade 1 until its connecting eye 32 in turn is flush with the attachment holes 13 or 52 and the open sleeves 25. The control tube 4 and the tension-torque-transmission element 3 are then finally attached to the rotor blade 1 in which the bolt 21 is pushed through the sleeves 25 and thus also through the control tube 4 and the tension-torque-transmission element 3 and is affixed on the opposite side by means of the counter nut 23.

The connecting means 2 essentially transmits the centrifugal forces, to which the rotor blade 1 is subjected in operation, to the tension-torque-transmission element 3 that transmits them from there to a hub (not shown) of a drive device. The bolt 21 is thus subjected to shearing forces and causes in the attachment holes 13, 52 a hole-face pressure, which the sleeves 25 in particular in the connecting section 11 of the rotor blade 1 transmit as evenly as possible to the fibre material at that location and introduce into the fibre layers. Control forces which the control lever 46 transmits to the control tube 4 in order to act on the rotor blade 1 as moments on its longitudinal axis represent a further load for the connecting means 2. These forces are less severe and load the connecting means 2 in a direction at a right angle to those loads resulting from the centrifugal force.

As far as loads from control forces are concerned, the connecting means 2 are relieved in that between the rotor blade 1 and the control tube 4 there is a positive fit. The flat circular cross section of the connecting section 11 with the walls 17 as plane-parallel flat parts fits in a positive-locking manner into the correspondingly shaped attachment section 48 of the control tube 4. By these means alone the control forces can already be transmitted so that the connecting means 2 only ensure redundancy of the connection between the rotor blade 1 and the control tube 4. An additional bonded connection can stop any micro-movement between the rotor blade 1 and the control tube 4. Said bonded connection provides a maintenance-free connection between the rotor blade 1 and the control tube 4 without any wear on their contact locations.

Figure 2:
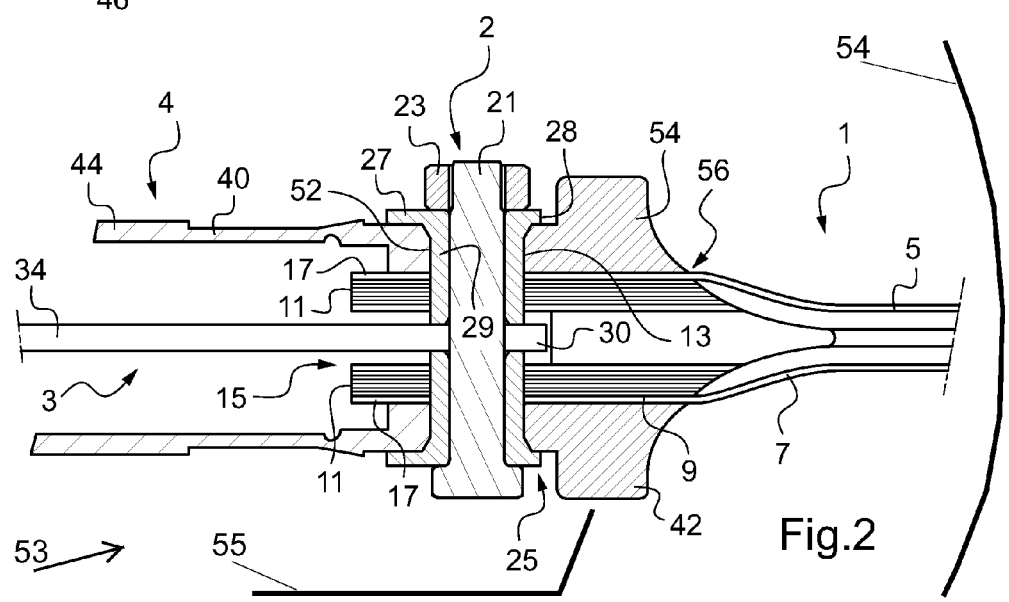
FIG. 2 an installed control tube on a rotor blade.

FIG. 2 shows a section view of the attachment of the tension-torque-transmission element 3 and of the control tube 4 on the rotor blade 1. FIG. 2 shows a tail rotor 53 of the shrouded type, e.g. in a FENESTRON. The shrouded rotor 53 has a shrouded duct 54 and a central hub 55, which may also be referred to as a "pot". FIG. 2 illustrates in particular a further function of the sleeves 25. Their two shafts 29 are dimensioned such in their axial longitudinal direction that after they have been inserted into the attachment holes 13, 52 and after the tension torque-transmission element 3 has been inserted into the receiving pocket 15, they centre said tension-torque-transmission element 3 within the receiving pocket 15. Said tension-torque-transmission element 3 is thus exactly situated in the centroidal axis of the rotor blade 1 so that, due to its centring, it can absorb and transmit onwards the centrifugal forces, which during operation are exerted on the rotor blade 1, without any moment loads resulting from eccentricity.

On the blade side the control tube 4 comprises a threading opening 56 that is covered in FIG. 1, into which during installation the rotor blade 1 is inserted with its connecting section 11 foremost (compare FIG. 1). The threading opening 56 is distant from the bearing arrangement section 42 on the blade side in a quasi-crater-shaped manner. Said threading opening 56 forms the blade-side end of a rounded transition section 54 which comprises a cross section that diminishes in axial direction towards the rotor blade 1.

FIG. 2 moreover illustrates the flow of the fibre layers that form the rotor blade 1. Coming in a straight-line and planar manner from the direction of the blade section 5, in the blade transition section 7 said fibre layers undergo a slight deviation in the opposite direction, quasi in an S-shape, in order to continue in a straight-line and parallel manner in the adjoining torque-transmission section 9 or connecting section 11. The overall very flat design of the coupling section on the one hand represents a design in accordance with the fibres, and on the other hand makes it possible to tie both the tension-torque-transmission element 3 and the control tube 4 in the same cross section.

The attachment hole 13 is drilled into the connecting section only at a later stage. This results in a very even and homogeneous design of the regular cylindrical hole-face of the attachment hole 13, from which its later production can be detected without any doubt. As a result of the undisturbed construction of the hole-face, the remaining cross section of the connecting section 11 can be fully exposed to loads right up to the margin of the attachment hole 13, which results in optimum cross-sectional utilisation and thus in minimal dimensions of the coupling section 11. The attachment hole 13 penetrates the fibre layers of the rotor blade 1 in the connecting section 11 perpendicularly to their plane of extension, with the load thus being optimal in accordance with the fibres. With force introduction by way of the bolt 21, no force deviation in the fibre layers occurs by way of the hole-face connection of the attachment hole 13, which force deviation could result in delamination in the connecting section 11. This in turn makes possible maximum loadability with minimum use of materials. This is beneficial in the context of economical production, a long service life, short external dimensions and light weight of the rotor blade 1.

FIG. 3 shows a rotor blade blank 1', which in principle is designed identically to the rotor blade 1 according to FIG. 1. It comprises a blade section 5' with a blade tip 6', a blade transition section 7', a torque-transmission section 9' and a connecting section 11'. In the illustration no attachment hole for attaching a tension-torque-transmission element or a control tube has been affixed yet, because it is only worked into the blade blank 1' at a later point in time.

The blade blank 1' is one example of an arrangement of fibre layers. It comprises fibre layers a to g, which extend in the direction of centrifugal force F, between which fibre layers further fibre layers r to t have been scarf-joined. The fibre layers a to g show those fibre layers that extend through the entire rotor blade 1' from its connecting section 11' on the hub side to its blade tip 6'. They comprise a unidirectional fibre material whose fibres extend in longitudinal direction of the fibre layer a to g. In transverse direction to the flow of the fibres, the fibres are held together chemically, or mechanically by being sewn.

The fibre layers r to t comprise a multiaxial fibre material whose fibre directions in the installed state extend at a right angle to each other but not so as to be parallel or orthogonal to the direction of the centrifugal force F. If need be they are multiply-positioned or scarf-joined between the fibre layers a to g so that between each two fibre layers a to g with unidirectional fibre orientation at least one fibre layer r, s or t extends, whose fibres are arranged at an angle of +/−45° to the unidirectional fibres. In this way the fibre package made thereof, and thus the blade blank 1', gain adequate stability also in transverse direction.

FIG. 4 shows a diagrammatic section view of the rotor blade 1' in the region of the blade section 5'. It comprises a front 60, against which air flows, and an opposing trailing edge 62 of a flat droplet shape with a top 64 and a bottom 66. Both on the top 64 and on the bottom 66 the profile comprises a step 68 on which on the surface from the front 60 of the blade section 5' an erosion protection device (not shown), for example made of metal, is applied.

The profile of the blade section 5' from the outside to the inside is then formed by the fibre layer a that envelopes the entire profile as a blade skin. It abuts the front 60 of the blade section 5'. Underneath it there follows the fibre layer r, which also abuts the front 25 and is largely congruent with the fibre layer a. While the first fibre layer a is designed with the fibre direction in longitudinal direction of the rotor wing, the fibres of the fibre layer r extend at an angle of approximately 45° to it.

The next following fibre layer b comprises a unidirectionally aligned fibre material that is adjacent to a fibre material of layer s that is again multiaxial. This is followed by the other fibre layers (not designated) which can not only be used individually but also multiply for each rotor wing 1', thus forming a stable blade body. The fibre layers envelope a foam core 70 that is arranged more closely to the trailing edge 27 of the blade section 5' so that the centre of gravity of the profile of the blade section 5' is in a frontal region in which the heavier fibre layers are located.

The illustration of FIGS. 3 and 4 only serves to show the principle of arranging the layers in the rotor blade 1'. In relation to the precise arrangement of the fibre layers a to g, r to t and further through-leading fibre layers and reinforcement- and filler layers in any case in the blade section 5' right to the connecting section 11', we refer to the European patent application EP 09 400 016.3, filed before the German Patent Office with the same filing date as the present patent application, in the name of Eurocopter Deutschland GmbH (inventor: Gerald Kuntze-Fechner) and which concerns a "Rotor wing with integrated tension-torque-transmission element and method for its production", whose content relating to this is expressly also incorporated to form the subject of the present application.

Since the rotor wing that has been described in detail above is only one exemplary embodiment, said exemplary embodiment can in the usual way be modified to a large extent by the average person skilled in the art without leaving the scope of the invention. In particular, the specific cutting of the fibre layers and the order of their arrangement can also take place in a form that differs from that described in this document. Likewise, the mechanical coupling on the coupling section, or the control tube, can be designed in some other form if this is necessary for reasons of space or for design reasons. Furthermore, the use of the indefinite article "a" or "one" does not preclude the possibility of the respective characteristics being present in plural numbers.

LIST OF REFERENCE CHARACTERS

1 Rotor blade
2 Connecting means
3 Tension-torque-transmission element
4 Control tube
5 Blade section
7 Blade transition section
9 Torque-transmission section
11 Connecting section
13 Attachment hole
15 Receiving pocket
17 Walls
21 Bolt
23 Counter nut
25 Sleeve 27 Collar
28 Flat part
29 Shank
30 Tie section
32 Connecting eye
34 Torque-transmission element
40 Base body
42 Bearing arrangement section
44 Bearing arrangement section
46 Control lever
48 Attachment section
50 Flat part
52 Attachment hole
54 Transition section
56 Threading opening
60 Front
62 Trailing edge
64 Top
66 Bottom
68 Step
70 Foam core
a to g Unidirectional through-fibre-layers
r, s, t Multiaxial fibre layers

What is claimed is:

1. A tail rotor of a rotary wing aircraft, the tail rotor being shrouded and having a central hub and a shrouded duct, the tail rotor having a rotor blade in a fibre-reinforced composite design, comprising:
a blade section having a blade skin and a blade body, wherein the blade section forms an aerodynamically effective profile;
a blade tip that faces the shrouded duct and faces away from the central hub of a drive device of the rotor;
a coupling section which faces towards the central hub, with an attachment device for a separate tension-torque-transmission element, the coupling section defining one single attachment hole, spar tapes that go all the way through the blade section from one end to the other, the spar tapes made of unidirectional fibre material and having an essentially rectangular cross-section, the single attachment hole defined by a cylindrical hole-face with a generally constant diameter extending through the coupling section, and
a single bolt for attaching the rotor blade to the central hub of the drive device using the single attachment hole, the single bolt also attaching a separate control tube to the rotor blade using the single attachment hole, the rotor blade and the control tube being separately formed, and the single attachment hole forming a hole-face by intersecting the planes of the spar tapes, the coupling section having a cured section and the single attachment hole being formed only in the cured section of the coupling section wherein the single attachment hole in the coupling section of the rotor blade is formed by a process comprising the step of machining the single attachment hole into the cured section of the coupling section of the rotor blade.

2. The tail rotor according to claim 1, characterised by a layered and staggered arrangement of the spar tapes for forming the aerodynamic blade profile.

3. The tail rotor according to claim 1, wherein the single attachment hole in the coupling section is configured to attach the rotor blade by way of a connection to the drive device that comprises a single bolt and a single counter nut.

4. The tail rotor according to claim 3, wherein the coupling section has a cross-sectional shape at the connection to the drive device, the cross-sectional shape fitting positively between the rotor blade and the control tube.

5. The tail rotor according to claim 1, characterised in that a torque-transmitting section is arranged in the coupling section between the blade section and the attachment hole.

6. The tail rotor to claim 1, further comprising the separate tension-torque-transmission element made in a fibre-reinforced composite design.

7. The tail rotor according to claim 2, characterised by a layered and staggered arrangement of the spar tapes for forming the aerodynamic blade profile.

8. The tail rotor of claim 1 wherein machining the single attachment hole comprises drilling.

9. A shrouded tail rotor of a rotary wing aircraft, comprising:
a drive device having a hub;
a composite blade having:
a blade section forming an aerodynamically effective profile,
a blade tip at an end of the blade section and facing away from the hub, and
a coupling section at an opposed end of the blade section and facing towards the hub, the coupling section defining a single attachment hole,
the blade being formed of spar tapes made of unidirectional fibre material that extend from the blade tip to the coupling section, the spar tapes comprising a plurality of fibre layers, each fibre layer made of unidirectional fibre material;
a tension-torque-transmission element connecting the hub to the single attachment hole of the coupling section using a single fastener and configured to transmit centrifugal forces between the hub and the blade; and
a control tube connected to the single attachment hole of the coupling section using the single fastener and configured to twist the blade;
wherein the attachment hole has a cylindrical hole-face with a generally constant diameter extending through the coupling section extending through the coupling section formed by a process comprising machining spar tapes within the cured coupling section to increase maximum loadability and minimize material usage; and
wherein the composite blade, the tension-torque-transmission element, and the control tube are separately formed.

10. The shrouded tail rotor of claim 9 wherein the control tube has an attachment section sized to receive the coupling section of the blade.

11. The shrouded tail rotor of claim 10 wherein the coupling section has first and second lateral walls; and
wherein the attachment section of the control tube has first and second flat parts, each flat part interfacing with a respective lateral wall to positively lock the control tube with the coupling section.

12. The shrouded tail rotor of claim 10 wherein the coupling section forms a receiving pocket sized to receive a connecting eye of the tension-torque-transmission element.

13. The shrouded tail rotor of claim 12 wherein the tension-torque-transmission element and the control tube are coaxial with one another.

14. The shrouded tail rotor of claim 11 wherein the control tube comprises an essentially tubular base body having a hub side and a blade side with an attachment section extending therebetween, the blade side having a larger diameter than the hub side.

15. The shrouded tail rotor of claim 14 wherein an edge of the hub side of the control tube is oblique relative to a rotational axis of the control tube; and wherein the control tube has a control lever extending outwardly from the hub side and positioned adjacent to the edge of the hub side at a maximum distance from the blade side.

16. The shrouded tail rotor of claim 14 wherein the blade side of the control tube has a generally cylindrical bearing arrangement section and an opening sized to receive the blade and spaced apart from the generally cylindrical bearing arrangement section by a rounded transition section having a cross section that diminishes in axial direction towards the opening.

17. The shrouded tail rotor of claim 9 wherein the tension-torque-transmission element comprises a first tie section defining a single connecting eye on one end of the element and a second tie section defining a single connecting eye on the opposed end of the element.

* * * * *